(12) United States Patent
Bergsten (10) Patent No.: US 7,082,390 B2
(45) Date of Patent: Jul. 25, 2006

(54) ADVANCED STORAGE CONTROLLER

(75) Inventor: James R. Bergsten, Danville, CA (US)

(73) Assignee: LSI Logic Corporation, Milpitas, CA (US)

( * ) Notice: Subject to any disclaimer, the term of this patent is extended or adjusted under 35 U.S.C. 154(b) by 891 days.

(21) Appl. No.: 10/135,228

(22) Filed: Apr. 30, 2002

(65) Prior Publication Data

US 2003/0204672 A1   Oct. 30, 2003

(51) Int. Cl.
*G06F 13/10* (2006.01)

(52) U.S. Cl. .................. 703/21; 703/13; 703/23; 703/24; 707/102; 711/114; 711/117

(58) Field of Classification Search ............ 711/114, 711/117; 707/102; 703/13, 23, 21, 24
See application file for complete search history.

(56) References Cited

U.S. PATENT DOCUMENTS

| | | | |
|---|---|---|---|
| 5,621,651 A * | 4/1997 | Swoboda | 703/23 |
| 6,073,209 A * | 6/2000 | Bergsten | 711/114 |
| 6,263,302 B1 * | 7/2001 | Hellestrand et al. | 703/17 |
| 6,282,610 B1 * | 8/2001 | Bergsten | 711/114 |
| 6,311,252 B1 * | 10/2001 | Raz | 711/117 |
| 6,345,368 B1 * | 2/2002 | Bergsten | 714/11 |
| 6,363,462 B1 * | 3/2002 | Bergsten | 711/162 |
| 6,460,122 B1 * | 10/2002 | Otterness et al. | 711/154 |
| 6,928,450 B1 * | 8/2005 | Mogi et al. | 707/102 |
| 6,928,451 B1 * | 8/2005 | Mogi et al. | 707/102 |

* cited by examiner

*Primary Examiner*—Fred Ferris
(74) *Attorney, Agent, or Firm*—Suiter West Swantz PC LLO (57) ABSTRACT

The present invention is directed to an advanced storage controller that is capable of providing parallel processing capabilities to a host processing system connected storage system to increase performance, functionality and reliability of the entire computing system. The advanced storage controller comprises at least one input interface and at least one output interface, a host device simulation component, a cache device component, a physical device component and a management component. Such an advanced storage controller further, includes one or more processor elements and storage elements, which may be shared by the components or dedicated to one component. Additionally, the advanced storage controller is scalable by the static or dynamic addition of components, processors and/or memory.

10 Claims, 5 Drawing Sheets

ADVANCED STORAGE CONTROLLER

CROSS REFERENCE TO RELATED APPLICATION

The present application is commonly owned and related to U.S. Pat. No. 6,073,209 issued on Jun. 6, 2000 and is herein incorporated by reference in its entirety.

FIELD OF THE INVENTION

The present invention generally relates to the field of computer systems, and particularly to devices which control data flow between one or more host processing systems and one or more data storage subsystems wherein the data controller provides a plurality of general and special purpose parallel processing functional units, which allow for an operator of the computer system to define the associations between the host processing systems, data controller and data storage subsystems to provide increased data protection and minimize host transfer latency.

BACKGROUND OF THE INVENTION

It is common to store large volumes of data on storage systems, which store the data on non-volatile mass storage devices, such as magnetic or optical disks. These storage systems sometimes handle valuable or irreplaceable data. For example, airline reservations, bank account management, electronic find transfers, shipping and receiving, inventory control, and the like. Consequently, there is a need to ensure that the valuable data contained in these storage systems is adequately protected against loss or damage.

Occasionally, however, a mass storage device will fail, resulting in the loss of stored data. Consequently, it is a common practice to store a back-up copy of data that is considered valuable on a separate, back-up storage device. For practical reasons, however, it is often necessary to locate the back up storage device in the same geographic vicinity as the primary storage device. As a result, both the primary data and the back-up copy may be lost or destroyed due to theft, vandalism, or natural disasters, such as fires, floods and earthquakes. Hence, there is a need for the capability to store multiple back-up copies of data in geographically separate locations, while still permitting quick and easy access by the host processing system to any back-up copy.

Therefore it is desirable to provide a storage controller, which provides parallel processing functional units, which increase data protection and provide increased control over the associations amongst devices in the computer system to reduce host transfer latency.

SUMMARY OF THE INVENTION

Accordingly, the present invention is directed to an advanced storage controller that includes a plurality of general and special purpose parallel processing functional units. Additionally, the storage controller includes one or more dedicated or shared special or general purpose processing elements and storage elements. The advanced storage controller further includes a data interface with at least one host processing system and at least one data interface with at least one storage system. Each storage system includes at least one mass storage device. The host interface is independent of a device type of the host processing system, and the storage interface is independent of the device type of the mass storage device.

It is desirable to have the associations between the host processing system and a storage system, in a computer system, controlled by a storage controller which provides the before mentioned functionality and allows multiple host processing systems at different locations to access any copy of stored data. It is further desirable that such a storage controller provide data caching, local and remote device access, device virtualization, protocol conversion and n-way mirroring.

The advanced storage controller allows an operator to control data flow and user command and control from the host processing system to the storage system. For example, in the advanced storage controller data is transferred to a mass storage device while at the same time a checksum formation/verification is being run on another storage controller. In other embodiments of the present invention the advanced storage controller may provide data compression and/or encryption protocols to the data while it is being transferred.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings. The present invention embodies providing for a user a single apparatus and method for increasing a computing system, made up of a host processing system connected to a storage system, performance, functionality and reliability. The advanced storage controller comprised of general and special purpose processing functional components may provide a distinct advantage over previous storage controllers in that these components enable the advanced storage controller to provide parallel processing capabilities to a user. For example, an advanced storage controller may enable encryption and checksum formation/verification while providing host processing systems with standard data transfer capabilities. The advanced storage controller is further, comprised of at least one input interface and at least one output interface, a host device simulation component, a cache device component, a physical device component and a management component. Such an advanced storage controller further includes one or more processor elements and storage elements, which may be shared by the components or dedicated to one component. Additionally, the advanced storage controller is scalable by the static or dynamic addition of components, processors and/or memory.

Figure 1A:
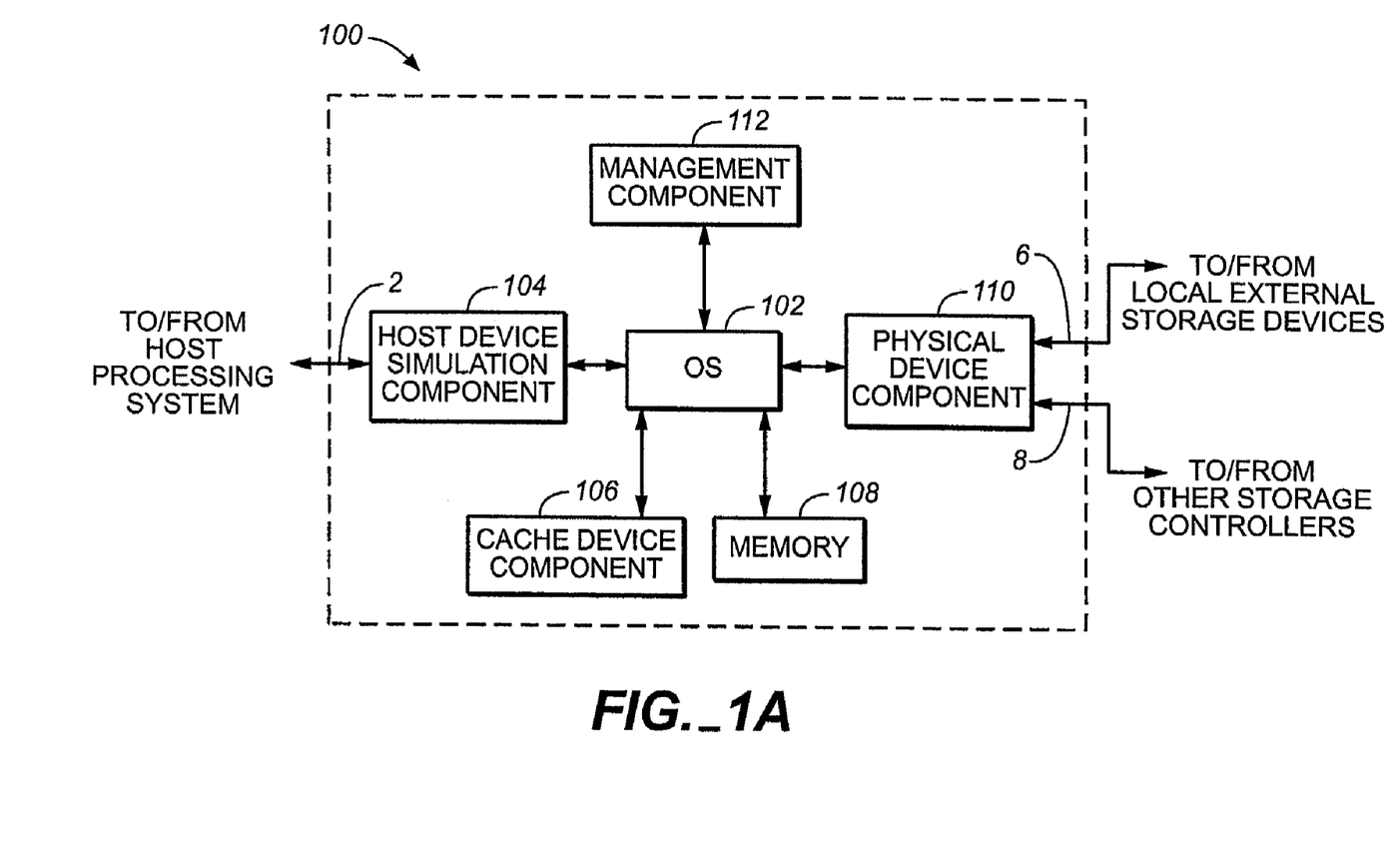
FIG. 1A is an illustration of an exemplary embodiment of the present invention wherein an advanced storage controller with functional modules is shown.
Figure 1B:
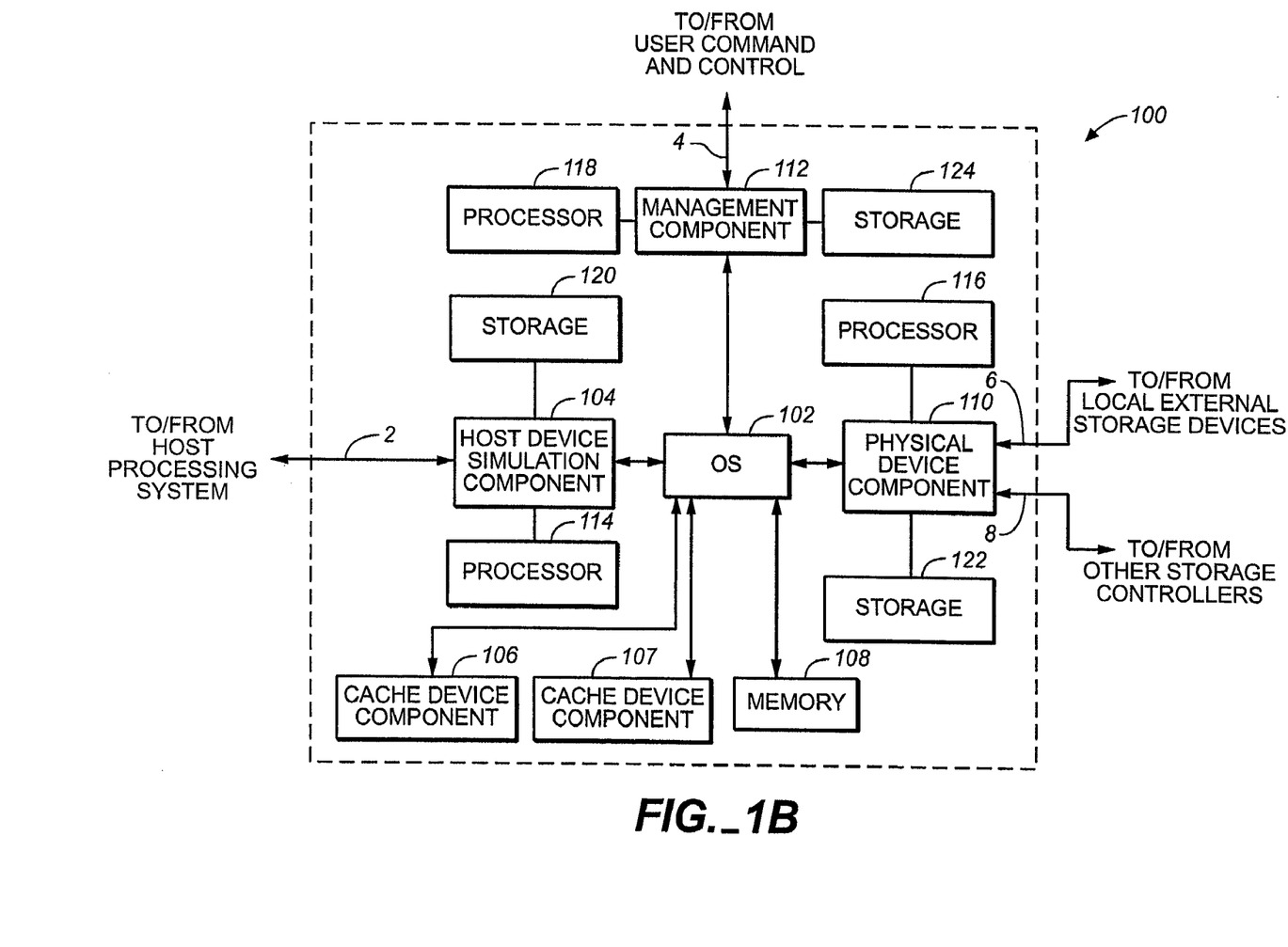
FIG. 1B is an illustration of an exemplary embodiment of the present invention wherein a scalable advanced storage controller with functional modules is shown.

Referring generally to FIGS. 1A and 1B, advanced storage controller 100 of the present invention with its functional modules is illustrated. Advanced storage controller 100 is peripheral to the host processing systems and physical devices, such as mass storage devices, other storage controllers and the like, which it interconnects. Each of these functional modules may be embodied in hardware, software, or a combination of hardware and software. Advanced storage controller 100 includes a processing element 102, a host device simulation component 104 a cache device component 106, a memory 108, a physical device component 110 and a management component 112.

Host device simulation component 104 is configured to present a plurality of industry standard devices, such as a storage system comprising a storage controller connected to a mass storage device, other storage arrays and the like, to one or more host processing systems connected via one or more host interfaces. Additionally, host device simulation component 104 maintains the state of each host processing system and moves data between the host(s) and the cache device component. Further, it may also convert host protocol and data to the storage systems internal formats, for example, from a file object to blocks of data on a storage device.

In the present embodiment host device simulation component 104 through one or more host interfaces provides the communicative pathway 2 that connects advanced storage controller 100 with one or more host processing systems using standard SCSI (Small Computer Systems Interface) protocols. Consequently, operation of advanced storage controller 100 is not dependent upon the particular hardware or software configuration of any host processing system or other physical devices, as long as those systems and devices are SCSI-compatible. It may be contemplated that the present invention is configured to operate within specific parameters and not allow such flexibility. Communication pathway 2, in other embodiments, may be configured for other protocols and standards, such as serial SCSI, Fiber Channel, DAFS (direct access file system), CIFS (common internet file system/services), AppleTalk, Netware, NFS (networked file system), ESCON (enterprise system connection) and the like.

Cache device component 106 emulates a plurality of host processing systems by maintaining all or a portion of device data in cache memory. This component initiates all staging of data into memory from physical device(s), such as mass storage devices, storage controllers and the like, on behalf or in anticipation of a host request for device data, and destages cache data that has been modified by a host. This component establishes and maintains n-way mirroring, copysets and "snapshot" copies.

The cache memory, in FIG. 1A, is shared amongst all cache devices. In FIG. 1B a plurality of cache device component 106 and 107 may provide special purpose storage, such as segmented use by a specific group of cache devices, thereby providing parallel access and minimizing latency. Cache devices are virtual devices "paged" into the physical cache memory of the storage subsystem.

Physical device component 110, through the use of two output interfaces, moves the data between the cache device component memory and one or more local or remote physical devices, as mentioned above, which may be directly attached to advanced storage controller 100 or attached to another storage controller. This component provides for host processing system to physical device virtualization, including data mapping, data striping and RAID. Physical device component 110 handles device error recovery.

Physical device component 110 through one or more output interfaces provides communicative pathways 6 and 8 that connect advanced storage controller 100 with one or more external physical devices using standard SCSI (Small Computer Systems Interface) protocols. Consequently, operation of advanced storage controller 100 is not dependent upon the particular hardware or software configuration of any mass storage device or other storage controllers, as long as those systems and devices are SCSI-compatible. It may be contemplated that the present invention is configured to operate within specific parameters and not allow such flexibility. Communication pathways 6 and 8, in other embodiments, may be configured for other protocols and standards, such as serial SCSI, Fiber Channel, DAFS (direct access file system), CIFS (common internet file system/services), AppleTalk, Netware, NFS (networked file system), ESCON (enterprise system connection) and the like.

The associations among host simulation device component 104, cache device component 106 and physical device component 110 are statically or dynamically defined by the end user of the storage controller. A host processing system with no physical device associations is a "solid state" or memory-only device. A host processing system with no cache device association is a "pass-through" device. A physical device with no host processing system association is a device mirror, a snapshot, spare or is reserved for internal data or metadata.

Management component 112 defines and allocates resources amongst the other components. The management component supplements the O/S and communicates with user command and control. It is a separate but attached (plurality of) processor(s) that independently monitors, initializes, controls, reports on, and otherwise keeps an eye on the rest of the system. The operating system running on these components may or may not be the same (or a derivation of the) operating system as that running on the advanced storage controller processor(s). In FIG. 1A management component 112 utilizes communication path 2. This is commonly known as in-band management because the host and management paths coincide.

In FIG. 1B management component 112 may, through one or more interfaces, provide communicative pathway 4 that connects advanced storage controller 100 with one or more user command and control stations using standard SCSI (Small Computer Systems Interface) protocols. This is commonly known as out-of-band management because the host and management paths are separate. The user command and control station allows a user to directly control the storage controller. The command and control station may be the host processing system, a separate information handling system, and the like. Consequently, operation of advanced storage controller 100 is not dependent upon the particular hardware or software configuration of any user command and control station, as long as it is SCSI-compatible. It may be contemplated that the present invention is configured to operate within specific parameters and not allow such flexibility. Communication pathway 4, in other embodiments, may be configured for other protocols and standards, such as serial SCSI, Fiber Channel, DAFS (direct access file system), CIFS (common internet file system/services), AppleTalk, Netware, NFS (networked file system), ESCON (enterprise system connection) and the like.

Thus, because data paths 2, 4, 6 and 8 are conventional interfaces, advanced storage controller 100 can be used concurrently with host processing systems, mass storage devices, other storage controllers and the like, each having different configurations. For example, one host processing system may be a mainframe while another is a personal computer. Additionally, one mass storage device may be magnetic disk while another includes CD-ROM drives.

Memory 108 provides shared general purpose local storage for the components. For example, it may be utilized in staging data accessed from the physical devices, destaging data from the host processing system, providing encryption protocols and the like. In other embodiments each component may have its own local memory.

Processing element 102 provides shared general purpose computer processing for advanced storage controller 100. It is contemplated that there may be a plurality of general purpose processing elements that are shared by each component. Such general purpose processors may be dedicated to a specific function or group of functions, or may be time or resource sliced. The processing element may be a special purpose processor, dedicated to a specific function, such as handling protocol conversion, encryption, checksum formation/verification, data compression or data movement.

Advanced storage controller 100 is scalable by the static or dynamic addition of functional components, processors and memory. As shown in FIG. 1B additional cache device component 107, dedicated processors 114, 116 and 118, and dedicated storage elements 120, 122 and 124 have been added. There is no specific limitation on the method of interconnecting functional components and may be accomplished by any means as contemplated by one of ordinary skill in the art. Additionally, each functional component is capable of being embodied in hardware, software or a combination of hardware and software.

Figure 2:
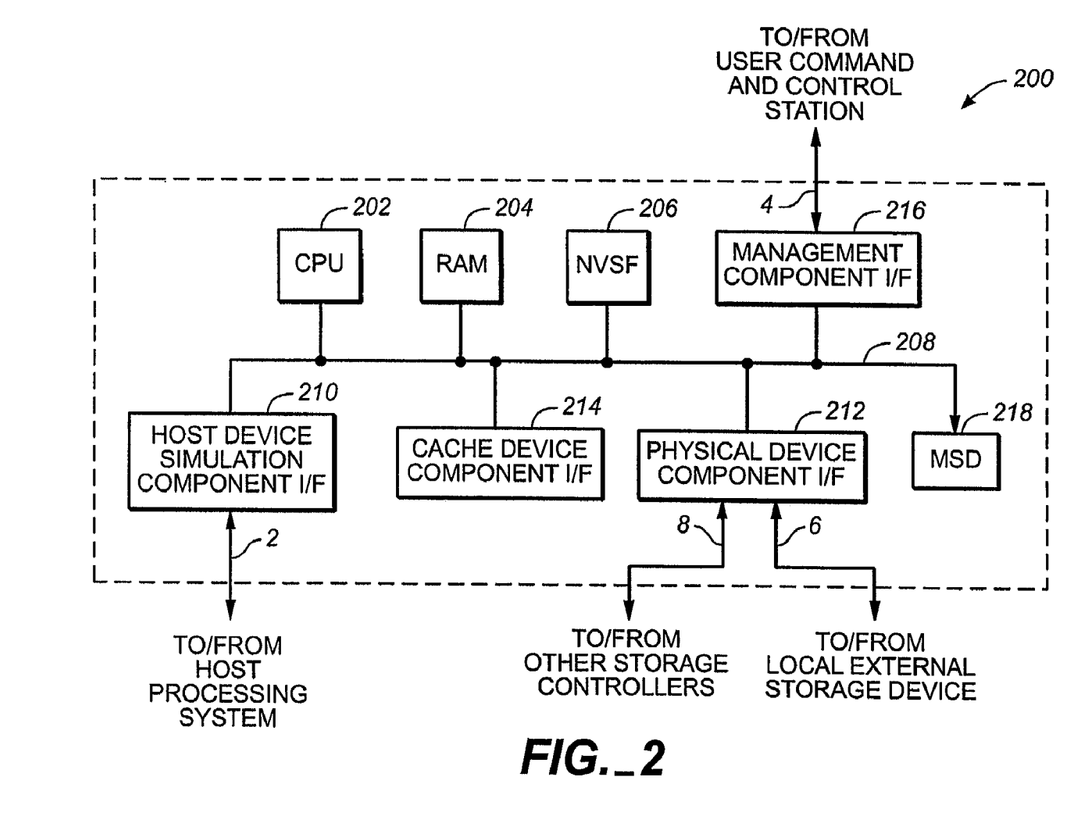
FIG. 2 is a block diagram of an advanced storage controller processing system.

FIG. 2 illustrates the hardware architecture of a processing system 200 of advanced storage controller 100, which includes a central processing unit (CPU) 202, a random-access memory (RAM) 204 and a non-volatile storage facility (NVSF) 206, each of which is coupled to a bus 208. Bus 208 may represent multiple physical or logical buses, which may be interconnected by various adapters and/or controllers. NVSF 206 may be, or may include, a plurality of internal disk drives, a read-only memory (ROM), a programmable read-only memory (PROM), an electrically erasable programmable read-only memory (EEPROM) and the like. Also coupled to bus 208 is a host device simulation component interface 210. Host device simulation interface connects host device simulation component 104 (shown in FIG. 1B) to bus 208. A physical device component interface 212 connects physical device component 110 (shown in FIB. 1B) to bus 208. A cache device component interface 214 connects cache device component 106 (shown in FIG. 1B) and a management component interface 216 connects management component 112 (shown in FIG. 1B) to bus 208. The component interfaces may include a variety of suitable devices as may be contemplated by one of ordinary skill in the art. Additionally, local bus 208 connects with mass storage device 218.

The host device simulation component 104 connects communication path 2 to local bus 208 in order to connect one or more host processing systems. Physical device component 110 connects communication paths 6 and 8 to local bus 208 in order to connect one or more local external storage devices and one or more additional storage controllers. Management component 112 connects communication path 4 in order to connect a user command and control station.

Figure 3:
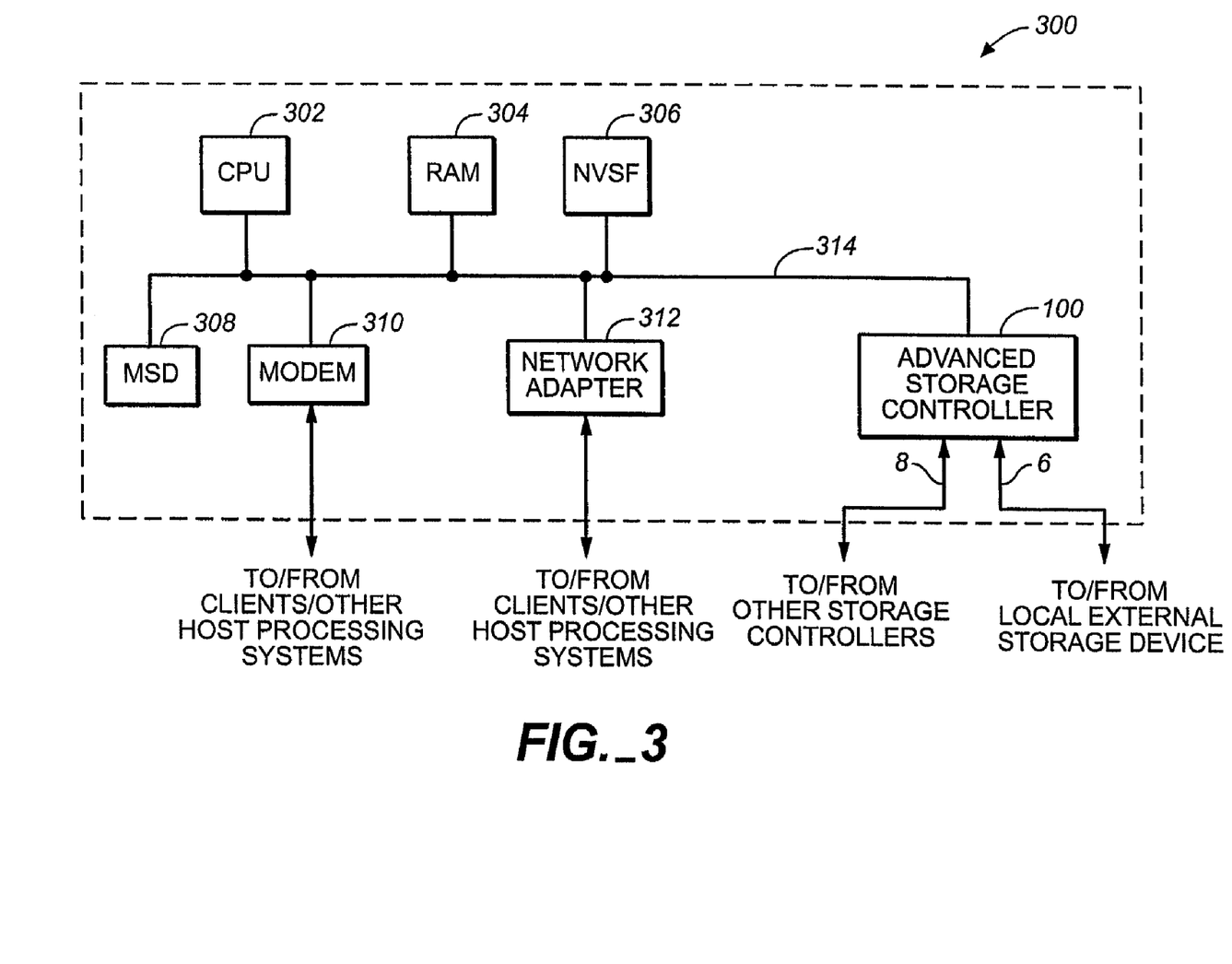
FIG. 3 is an illustration of an exemplary embodiment of the present invention wherein a host processing system with an integrated advanced storage controller is shown.

Advanced storage controller 100 may be an internal component of a host processing system, rather than a separate, external unit. FIG. 3 illustrates a host processing system 300 with advanced storage controller 100 integrated within. Host processing system 300 includes a CPU 302, a RAM 304, a non-volatile storage facility (NVSF) 306, a mass storage device (MSD) 308, a modem 310, a network adapter 312 and advanced storage controller 100, each of which is coupled by a local bus 314. Local bus 314 may be any conventional local bus, such as a PCI (Peripheral Component Interconnect) bus. Advanced storage controller 100 is hard wired into host processing system 300. It is contemplated that advanced storage controller 100 may be constructed on an add-in card inserted into host processing system 300. Communication paths 6 and 8 to local external storage devices and other storage controllers are provided through one or more external connectors on host processing system 300.

Figure 4:
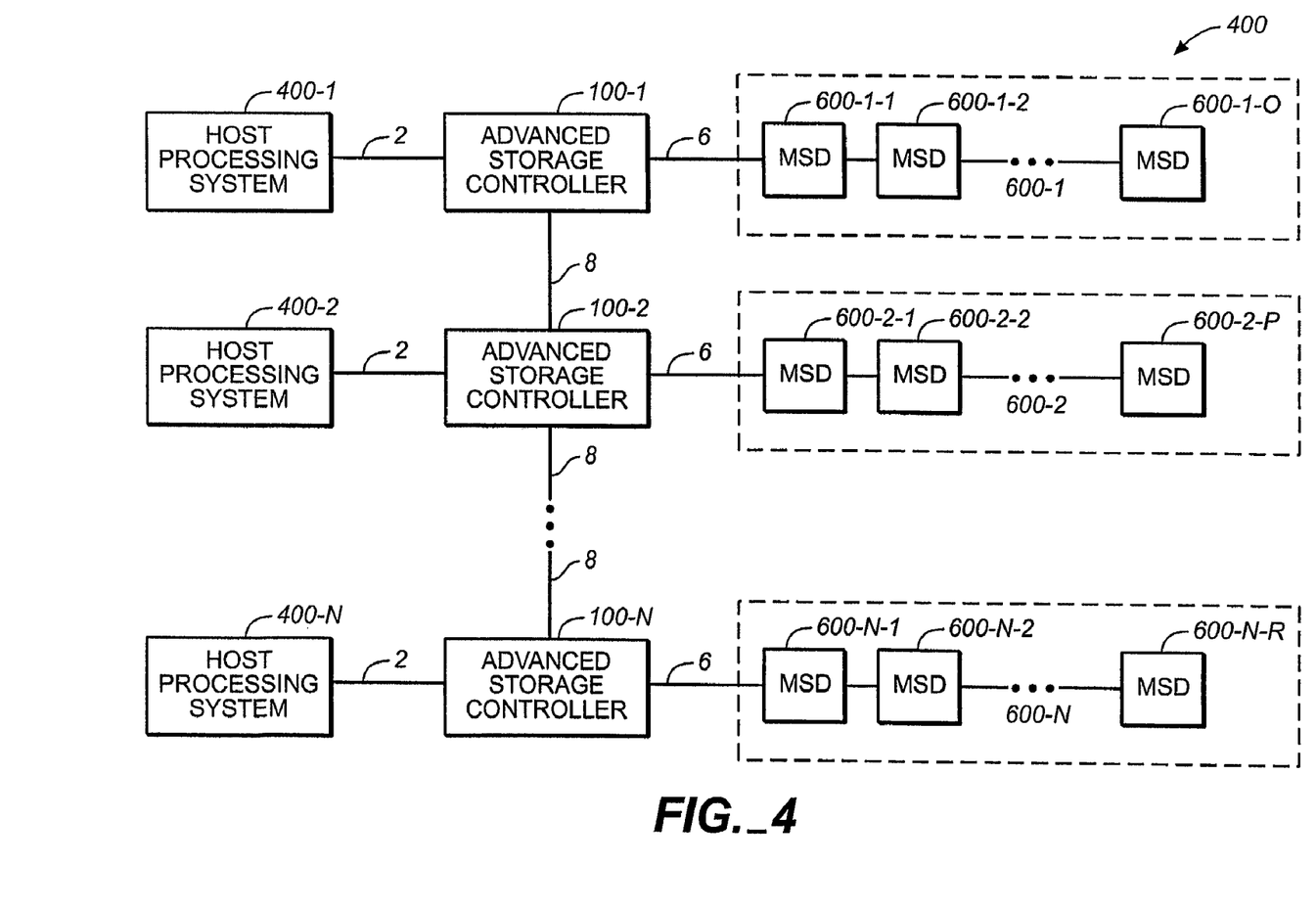
FIG. 4 illustrates a computing system in which a number of advanced storage controllers provide multiple host processing systems with access to multiple storage arrays.

FIG. 4 illustrates a computing system 400 in which a number of advanced storage controllers of the present invention provide a number of host processing systems with access to a number of local external storage arrays and other storage arrays. Specifically, the computing system includes N advanced storage controllers, 100-1 through 100-N; N host processing systems, 400-1 through 400-N, which are coupled, by multiple communication paths 2, to advanced storage controllers 100-1 through 100-N, respectively. The computing system further includes N storage arrays, 600-1 through 600-N, which are coupled, by multiple communication paths 6, to advanced storage controllers, 100-1 through 100-N, respectively. Each of the storage arrays includes a number of mass storage devices (MSDs) coupled to a storage controller in a daisy chain configuration. Specifically, storage array 600-1 includes O MSDs, 600-1-1 through 600-1-O; storage array 600-2 includes P MSDs, 600-2-1 through 600-2-P; and storage array 600-N includes R MSDs, 600-N-1 through 600-N-R.

Each advanced storage controller is coupled to another storage controller via communication path 8. A portion of a communication path 8 between two geographically separated fault tolerant hardware components may be provided by a local area network (LAN), such as a Fast Ethernet while other portions of communication path 8 can be implemented as an ATM (Asynchronous Transfer Mode) link, a T1 or T3 link, and FDDI (Fiber Distributed Data Interface) link, Ir (Infrared), or any other suitable type of link. Communication path 8 is an independent pathway of communication and allows the storage controllers to signal successful receipt of data and successful or unsuccessful destage of data. Further, in the case of one storage controller failing, one of the others can signal the host processing system of this failure and maintain proper functioning and data access capabilities.

Note that any of the data communication paths 2, 4, 6 and 8 may actually include two or more redundant, physical paths. Therefore, a failure of any single physical connection does not affect the ability to access any stored data.

Each of the host processing system may be any conventional information handling system such as a personal computer, a mini-computer, a mainframe and the like. In addition, any of the host processing system may function as a server for one or more client information handling systems (not shown).

Each mass storage device may include a non-volatile facility for storing large volumes of data, such as a magnetic disk or tape, an optical storage device such as CD-ROM (Compact Disc-ROM), CD-R (CD-recordable), DVD (Digital Versatile Disc), a magneto-optical (MO) device and the like. The mass storage devices within the computing system need not be of the same device type. That is, the mass storage devices in any given storage array may use a different type of storage medium from those in any other storage array.

Each storage array may be located geographically distant from the other storage arrays. Multiple copies are generally maintained on different, geographically-separated storage arrays. Hence, the loss of one or more mass storage devices in a given storage array will not result in the complete loss of data. With respect to a given (local) advanced storage controller, any or all of the other (remote) storage controllers, host processing systems and storage arrays may therefore be located at distant locations to the local advanced storage controller.

The advanced storage controllers and non-advanced storage controllers, communicatively linked, operate in peer-to-peer relationships with each other when responding to the operational environment. For instance, any advanced storage controller can be designated as the local system. Meaning that in the case of failure of the original local advanced storage controller another, which is communicatively linked can take over its functions permanently or until repairs are made and the original is functioning properly again.

The present invention is not limited to the specific configuration shown in FIG. 4. For example, the system configuration might alternatively include only a single host processing system, which is coupled to multiple geographically separated advanced storage controllers. The fault tolerant components may be a mixture of embedded advanced storage controller within a host processing system and separate advanced storage controllers. Other configurations as contemplated by one of ordinary skill in the art do not depart from the spirit and scope of the present invention.

It is believed that the advanced storage controller of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A system, comprising:
one or more host devices;
one or more storage controllers connected with the one or more host devices, wherein at least one of the one or more storage controllers is an advanced storage controller further comprising:
a host device simulation component capable of connecting with the one or more host devices, wherein the host device simulation component is configured to present one or more physical devices to the one or more host devices via a plurality of host interfaces, maintain a state of each of the one or more host devices and convert host protocol and data from the one or more host devices to internal formats of the one or more physical devices;
a physical device component capable of connecting with the one or more physical devices, wherein the physical device component is configured to provide virtualization between the one or more host devices and the one or more physical devices and provide device error recovery;
a cache device component connected with the host device simulation component and the physical device component providing cache memory and capable of segmenting the cache memory for use by a specific group of cache devices, the cache device component being configured to emulate the one or more host devices by maintaining at least one of all and a portion of the one or more host devices data in cache memory, initiate staging of data into memory from the one or more physical devices, initiate destaging of data from cache memory that has been modified by the one or more host devices and establish and maintain n-way mirrors, copy sets and snapshot copies of the data provided by the one or more host devices;
one or more processing elements and memory elements connected with the host device simulation component, the physical device component and the cache device component; and
a management component capable of connecting with the host device simulation component, the physical device component, the cache device component and the one or more processing elements and memory elements, wherein the management component is configured to define and allocate resources amongst the host device simulation component, physical device component and the cache device component and communicate with an operator of the storage controller, wherein the system is configurable and controllable from at least one of a local or a remote location;
wherein the cache device component is capable of providing parallel processing functionality to the advanced storage controller.

2. The system of claim 1, wherein the host device simulation component is further configured to move data between the one or more host devices and the cache device component.

3. The system of claim 1, wherein the physical device component is further configured to move data between the cache device component and the one or more physical devices.

4. The system of claim 1, wherein the one or more physical devices are at least one of locally and remotely located, directly attached to the plurality of storage controllers and attached to another storage controller and the virtualization includes data mapping, data striping and redundant array of independent disks methods.

5. The system of claim 1, wherein the host device simulation component, physical device component, cache device component and management component share a plurality of general purpose processing elements dedicated to at least one of a specific function and a group of functions and are configured to be at least one of time sliced and resource sliced.

6. The system of claim 1, wherein the host device simulation component, physical device component, cache device component and management component are connected to a plurality of special purpose processing elements that are dedicated to a specific function.

7. The system of claim 1, wherein the host device simulation component, physical device component, cache device component and management component share a common memory element.

8. The system of claim 1, wherein the host device simulation component, physical device component, cache device component and management component each connect with a separate local memory element.

9. The system of claim 1, wherein the one or more host devices are host information handling systems.

10. The system of claim 1, wherein the one or physical devices are storage arrays further comprising a plurality of mass storage devices.

* * * * *